United States Patent [19]

Carroll

[11] Patent Number: 4,549,725
[45] Date of Patent: Oct. 29, 1985

[54] CUTTING TOOL GUIDE

[76] Inventor: Roger W. Carroll, 1029 E. Prarie St., Jerseyville, Ill. 62052

[21] Appl. No.: 676,412

[22] Filed: Nov. 28, 1984

[51] Int. Cl.⁴ .............................................. B23K 7/10
[52] U.S. Cl. ...................................... 266/58; 266/66; 266/76; 266/77
[58] Field of Search ...................... 266/48, 58, 66, 76, 266/77, 70

[56] References Cited

U.S. PATENT DOCUMENTS

| | | | |
|---|---|---|---|
| 2,747,856 | 5/1956 | Burdwood | 266/66 |
| 3,139,471 | 6/1964 | Root | 266/70 |
| 3,734,477 | 5/1973 | Enfantino | 266/58 |
| 4,273,313 | 6/1981 | DeNardo | 266/76 |
| 4,283,044 | 8/1981 | McKibbin et al. | 266/58 |
| 4,391,433 | 7/1983 | Doan | 266/77 |
| 4,405,117 | 9/1983 | Ohlaug | 266/76 |
| 4,411,411 | 10/1983 | Barthelmess | 266/66 |

Primary Examiner—Wayland Stallard
Attorney, Agent, or Firm—Harvey B. Jacobson

[57] ABSTRACT

A cutting guide for a blowtorch comprises a channel-shaped body member with front, back, and intermediate limbs, and a holder attachment for a blowtorch on its exterior. The back and intermediate limbs of the body member form a female slide member for receipt on a guide rail along which the body member is moved while cutting a metal plate or the like. The front limb is spaced forwardly of the intermediate limb to form a splatter shield protecting the female slide member against molten metal and slag formed while cutting, so as not to impede smooth sliding of the guide along the rail.

11 Claims, 4 Drawing Figures

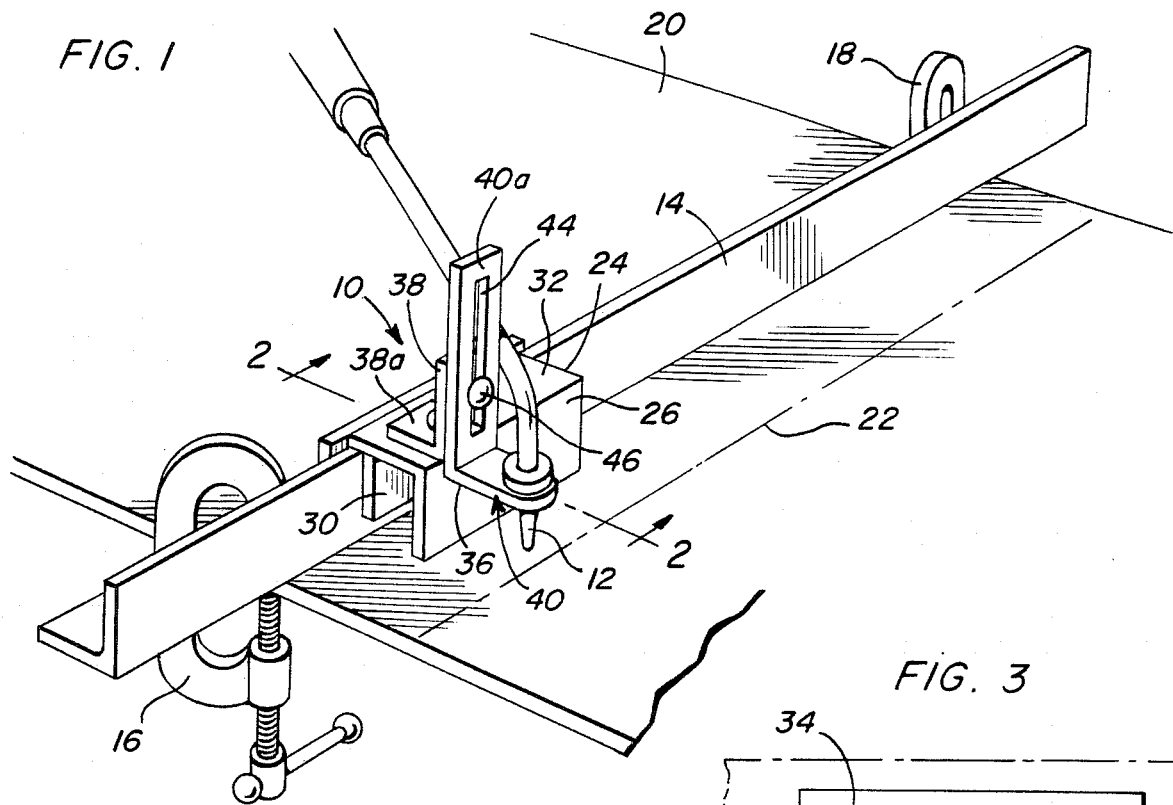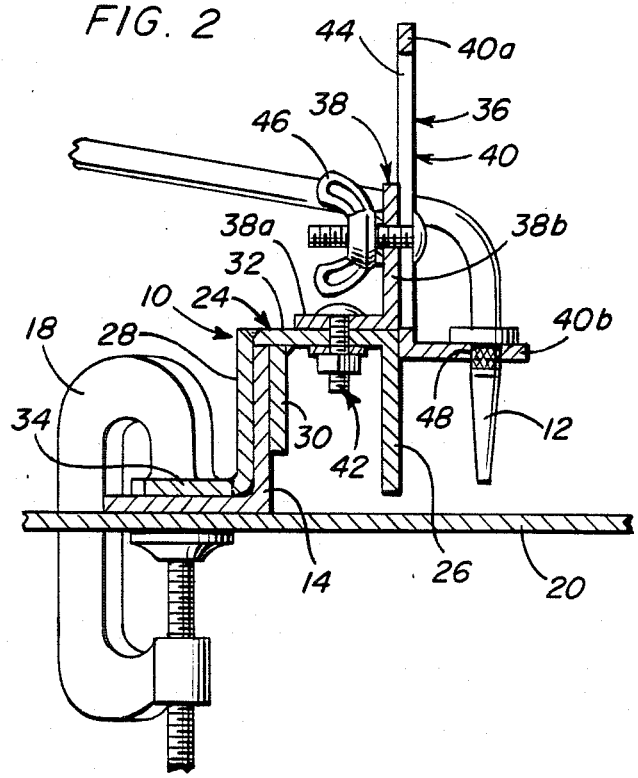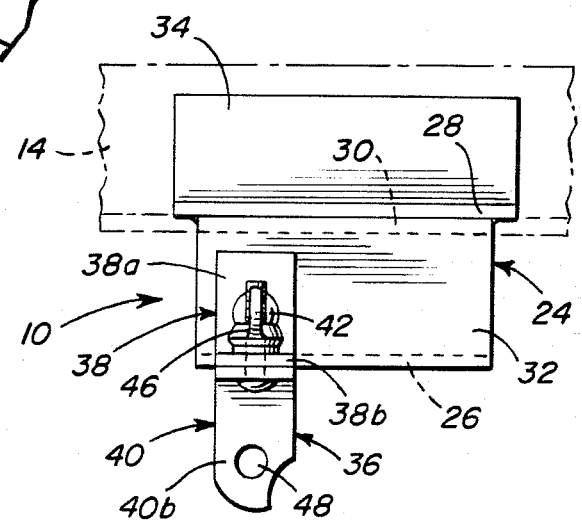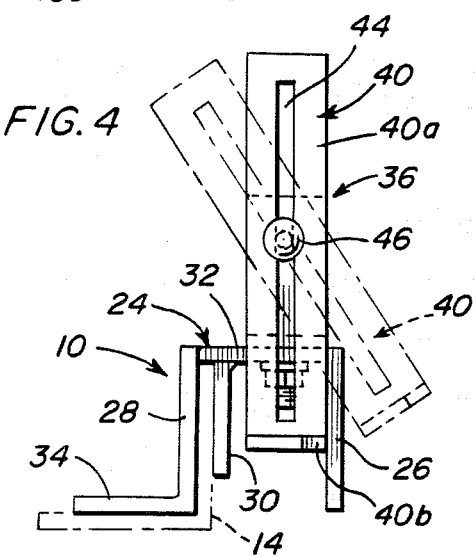

CUTTING TOOL GUIDE

BACKGROUND OF THE INVENTION

This invention relates to a guide assembly which can be used for supporting and guiding a cutting tool, such as a blowtorch used for cutting metal plate and the like. The invention provides an assembly which may include the facility for preventing molten metal, slag, and the like produced by a blowtorch during cutting from splattering against moving parts of the guide and interfering with smooth operation thereof. The guide may also include a cutting tool support that can be readily adjusted to enable metal plate and the like to be cut at an angle.

STATEMENT OF PRIOR ART

Applicant is aware of the following U.S. patents, the relevance of which is that they disclose cutting guide attachments and the like. None of the patents, however, discloses a cutting tool guide having the features of the present invention. U.S. Pat. Nos.
2,747,856
3,139,471
4,411,411
4,391,433

SUMMARY OF THE INVENTION

The invention provides a cutting tool guide for a blowtorch and the like comprising a channel-section body member with front and back limbs connected by a channel web, and an internal limb adjacent the back limb so as to define in conjunction therewith a female slide member for receipt on a guide rail, the front limb being spaced from the slide member so as to define a splatter shield for protecting the slide member against molten metal, slag and the like produced when cutting metal plate, the guide further including a cutting tool support attachment on the exterior of the body member.

The guide is intended for use in conjunction with a guide rail which may, for example, comprise an upright web of a length of angle iron clamped on a metal plate to be cut, and with this arrangement the front limb of the body member forms an effective splatter shield protecting the slide member against impingement by molten metal, slag and the like during cutting and thereby providing unimpeded movement of the guide along the rail. The guide may be used in conjunction either with a vertically disposed guide rail, for cutting horizontal plate, or with a horizontally disposed guide rail for cutting vertical plate. The back limb of the body member may be provided with an outwardly directed flange for stabilizing the guide during cutting.

The cutting tool support attachment may comprise a pivotal bracket mounted atop the body member, and a cutting tool holder carried by the bracket in a manner whereby pivoting movement of the bracket allows the holder to be disposed either forwardly of the front limb of the body member, or to one end of the body member. The holder may itself be pivotally mounted on the bracket so that when located at the end of the body member, it can be inclined to a position enabling a cutter mounted therein to cut at an angle. The holder may also have a height adjustment with respect to the bracket.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a perspective view of a cutting tool guide in accordance with the invention shown in use on a guide rail for cutting a metal plate.

FIG. 2 is an enlarged sectional on view on line 2—2 of FIG. 1.

FIG. 3 is a plan view of the guide.

FIG. 4 is an end view of the guide with a cutting tool support shown in an adjusted position.

DESCRIPTION OF PREFERRED EMBODIMENT

Referring to the drawings in detail, a cutting tool guide 10 supporting a cutting tool 12 in the form of a blowtorch is shown mounted on a guide rail 14 which is clamped by G-clamps 16, 18 on a metal plate 20, so that the blowtorch may cut the plate in a straight line, indicated at 22 in FIG. 1, by movement of the guide 10 along the rail. Guide 10 includes a channel-shaped body member 24 having a front limb 26, a back limb 28, an internal limb 30, and an upper web 32. The back limb 28 and internal limb 30 are spaced apart by a suitable distance together to form a female slide member fitting on the upright limb of rail 14, which is in the form of an angle-iron having a base limb clamped to the metal plate 20. Also, back limb 28 of body member 24 may have an outwardly directed flange 34 bearing against the guide rail and stabilizing the body member during sliding movement along the rail. Front limb 26 of the body member is spaced from internal limb 30 to form a splatter shield protecting the internal and back limbs from molten metal, slag, and the like produced during cutting, so as not to interfere with smooth movement of the body member along rail 14. Body member 24 may be fabricated from suitably profiled metal plates, as shown in the drawings, or it may be in the form of an extrusion.

Guide 10 further includes a cutting tool support attachment 36 mounted on the exterior of body member 24, attchment 36 including a mounting bracket 38 and a cutting tool holder 40. Bracket 38 is in the form of an angle-iron having a base web 38a and an upright web 38b, the base web being pivotally attached to web 32 of body member 24 by a bolt-and-nut connection 42 in a position allowing upright web 38b to be swivelled to the front of the body member, as shown in FIGS. 1 to 3, or to one end of the body member as shown in FIG. 4. Holder 40 is L-shaped having an elongate slot 44 in its vertical limb 40a, by which the holder is pivotally attached to web 38b by means of a screw and wing nut connection 46, which allows the height of holder 40 to be adjusted, and also allows its angle of inclination to be adjusted (FIG. 4) so that when the holder is positioned at the end of the body member 24, the cutter can be used to form an angle cut in the metal plate as shown in dotted line in FIG. 4. Horizontal limb 40b of holder 40 has an opening 48 or like retention means for receiving cutting tool 12. It will be noted that in both illustrated positions of the cutting tool holder 40, it is situated to locate the operative tip of the cutting tool forwardly of limb 26 of the body member which forms the splatter shield.

The cutting guide is shown in use cutting a horizontally disposed plate 20, but the design of the slide rail and interfitting limbs 28, 30 of the body member also allows it to be used at other angles. The guide is simple and economical to construct, it is sufficiently non-bulky so as to give an operator a substantially unimpeded view of the work, its moving parts are protected against splattering of molten metal and slag, and it is versatile in its usage.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cutting guide for use in guiding a cutting tool such as a blowtorch along a guide rail for cutting metal plate and the like comprising a body member having means defining a slide member for receipt on the guide rail, a holder attachment on the exterior of the body member for receiving the cutting tool and holding same with an operating tip of the tool in position spaced forwardly of the slide member, and means forming a splatter shield between the operating tip of the cutting tool and the slide member for protecting the slide member against molten metal and the like produced by the cutting tool during cutting.

2. The invention of claim 1 wherein the body member is of channel-shaped cross section having a back limb, a front limb, an internal limb and an upper web connecting the limbs, the back and internal limbs together defining the slide member for receipt on the guide rail, and the front limb being spaced from the internal limb to form the splatter shield.

3. The invention of claim 2 wherein the back limb terminates in an outwardly directed flange for stabilizing the guide in travel along the guide rail.

4. The invention of claim 3 in combination with an angle-section guide rail having one limb for receipt in the slide member and the other limb for engagement by said outwardly directed flange.

5. The invention of claim 2 wherein the holder attachment comprises a mounting bracket on the web of the body member, and a cutting tool holder attached to the bracket for vertically adjusting movements of the holder.

6. The invention of claim 5 wherein the bracket is pivotally attached to the web of the body member for moving the holder between a first position forwardly of the front limb of the body member, and a second position at one end of the body member, the holder being mounted on the bracket for pivotal adjustment when in the second position so as to enable a workpiece to be cut at an angle.

7. A cutting guide for use in guiding a cutting tool such as a blowtorch along a guide rail for cutting metal plate and the like comprising a channel-shaped body member having front, back, and intermediate limbs connected by an upper web, the back and intermediate limbs being spaced apart to form a female slide member for mounting the body member on the rail, the front limb being spaced forwardly of the intermediate limb to form a splatter shield for the female slide member, and the guide further including a cutting tool holder attachment on the exterior of the body member for holding a cutting tool with an operative end thereof forwardly of the front limb.

8. The invention of claim 7 wherein the tool holder attachment comprises a bracket on the web of the body member and a tool holder vertically adjustably attached to the bracket.

9. The invention of claim 8 wherein the holder comprises a slotted limb adjustably attaching the holder to the bracket and a cutter-receiving limb.

10. The invention of claim 9 wherein the bracket is pivotally attached to the web for movement of the holder between a first position forwardly of the front limb of the body member and a second position at one end of the body member, the holder in the second position being pivotally adjustable on the bracket to change the angle of cut of the cutting tool.

11. The invention of claim 7 wherein the back limb of the body member terminates in an outwardly directed stabilizing flange.

* * * * *